United States Patent [19]
Artzberger

[11] 3,877,102
[45] Apr. 15, 1975

[54] SAFETY LEG SUPPORT FOR A DOCKBOARD

[75] Inventor: Thomas G. Artzberger, Menomonee Falls, Wis.

[73] Assignee: Kelley Company, Inc., Milwaukee, Wis.

[22] Filed: May 20, 1974

[21] Appl. No.: 471,664

[52] U.S. Cl. .................................................... 14/71
[51] Int. Cl. ........................................... B65g 11/00
[58] Field of Search ....................................... 14/71

[56] References Cited
UNITED STATES PATENTS

| | | | |
|---|---|---|---|
| 3,117,332 | 1/1964 | Kelley | 14/71 |
| 3,137,017 | 6/1964 | Pfleger | 14/71 |
| 3,368,229 | 2/1968 | Pfleger | 14/71 |
| 3,606,627 | 9/1971 | Potter | 14/71 |
| 3,646,627 | 3/1972 | Potter | 14/71 |
| 3,728,753 | 4/1973 | Beckwith | 14/71 |

*Primary Examiner*—Nile C. Byers, Jr.
*Attorney, Agent, or Firm*—Andrus, Sceales, Starke & Sawall

[57] ABSTRACT

A safety leg construction for a dockboard which acts to limit normal slow descent of the ramp, as well as rapid descent of the ramp, after a truck pulls away from the dock. Safety legs are hinged to the undersurface of the forward edge of the ramp and are biased to a forward supporting position and are pivotable to a retracted non-supporting position. The legs are coupled to the lip of the dockboard through a releasible latch mechanism which includes an acceleration responsive element. In normal operation when a truck pulls away from the dock after the loading operation is completed, the ramp descends slowly, and the lip pivots downwardly toward the pendant position and the legs pivot toward the forward supporting position to engage fixed supports and support the ramp against further descent. Under a rapid gravitational descent of the ramp caused by an added load on the ramp when the truck pulls away from the dock, the increased acceleration of the ramp will actuate the acceleration responsive element to release the latch mechanism and enable the legs to return, under the force of the biasing means, to the supporting position independently of the position of the lip, to thereby support the ramp against further descent.

14 Claims, 5 Drawing Figures

SAFETY LEG SUPPORT FOR A DOCKBOARD

BACKGROUND OF THE INVENTION

An adjustable dockboard as shown in the U.S. Pat. No. 3,137,017 includes a ramp having its rear edge hinged to a dock. The ramp is biased upwardly to an inclined position by a spring assembly and a manually releasable hold-down device holds the ramp against elevation. Hinged to the front edge of the ramp is an extension lip which is adapted to swing from a pendant position, in which the lip hangs downwardly from the front edge of the ramp, to an elevated position in which the lip forms an extension to the ramp. The lip, when in the extended position, is adapted to engage the bed of a truck or carrier and bridge the gap between the ramp and the truck to enable material handling equiptment to move between the dockboard and the truck.

In the dockboard as disclosed in U.S. Pat. No. 3,137,017, the extension lip is automatically raised to its elevated position by a lip lifting and latching mechanism which is actuated by the upward movement of the ramp when the hold-down device is released. With the lip extended and the ramp in the upward inclined position, the ramp is walked down by the operator until the lip engages the bed of the truck. The engagement of the lip with the bed of the truck releases the weight from the lip latching mechanism, thereby releasing the latching mechanism so that when the truck pulls away from the dock the lip will automatically return to its pendant position.

To support the ramp is a generally horizontal or cross traffic position, cross traffic legs have been used in association with the ramp. U.S. Pat. No. 3,137,017 discloses cross traffic legs having spaced abutments adapted to engage fixed stops on the dock and act to support the ramp either in an upwardly inclined, above dock level position; a horizontal, cross traffic position; or a downwardly inclined, below dock level position.

In accordance with the disclosure of the aforementioned U.S. Pat. No. 3,137,017, the cross traffic legs are pivoted to the front edge of the ramp and are normally biased forwardly. The cross traffic legs of U.S. Pat. No. 3,137,017 are coupled to the lip, so that as the ramp is elevated and the ip is extended the cross traffic legs will automatically be pivoted to the rear. After loading, as the truck pulls away from the dock and the lip pivots downwardly from the extended to the pendant position, the cross traffic legs are urged forwardly to engage the fixed stops and prevent further descent of the ramp.

It has been found that in situations where the truck pulls away from the loading dock while a load, such as fork lift truck, or cargo, is on the ramp, the cross traffic legs could not respond quickly enought to catch or restrain the sudden descent of the ramp. Under conditions of sudden or rapid gravitational drop through inertia, the lip of the ramp tends to maintain its extended position with respect to the ramp, thereby maintaining the cross traffic legs in the retracted position and preventing the legs from engaging the supporting stops.

The U.S. Pat. No. 3,368,229 is directed to a safety leg mechanism which is intended to prevent the sudden gravitational descent of the ramp caused by a load on the ramp when the truck pulls away from the dock. In accordance with the disclosure of U.S. Pat. No. 3,368,229, a tube is supported on the dock and a strut which moves up and down with the ramp is slidable within the tube. The strut has downwardly facing ratchet teeth which coact with a pawl of an escapement device on the tube to support the ramp against descent and thereby prevent accidental descent of the ramp. An inertia responsive control for the escapement device keeps the pawl from engaging a ratchet tooth during gradual descent of the ramp, but on an initial sudden downward movement of the strut, the pawl engages the ratchet teeth and prevents the free downward movement of the ramp.

SUMMARY OF THE INVENTION

The present invention relates to a supporting leg construction for an adjustable mechanical dockboard which functions to limit both normal slow descent of the ramp, as well as rapid descent of the ramp, after a carrier pulls away from the dock. The supporting leg construction includes a pair of legs which are hinged to the front edge of the ramp and are biased toward an upright supporting position but can be pivoted to a retracted position. Each leg is provided with a series of abutments which are adapted to engage fixed supports on the frame of the dockboard to thereby support the ramp in a series of elevations.

The hinged supporting legs are coupled to the lip through a releasable latch mechanism that includes an acceleration responsive element. Under normal operation, as the ramp is elevated, the lip is moved toward the extended position, and the legs, being coupled to the lip, will be moved to the retracted or inoperative position. Under conditions of normal slow descent of the ramp when the truck pulls away from the dock after the loading operation is completed, the lip will pivot downwardly toward the pendant position and the supporting legs will move forwardly toward the upright supporting position, whereby one of the abutments on the legs will engage the fixed support to limit further descent of the ramp. However, under conditions of sudden gravitational descent of the ramp, which can occur if a load is on the ramp when the truck pulls away from the dock, the increased acceleration of the ramp will actuate the acceleration responsive element to release the latch mechanism and enable the supporting legs to return to the supporting position independently of the position of the lip. The legs, being biased to the upright supporting position, will engage the fixed supports on the frame to thereby limit downward movement of the ramp.

The supporting leg construction of the invention is a simplified structure which acts to limit both normal slow descent and rapid descent of the ramp.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
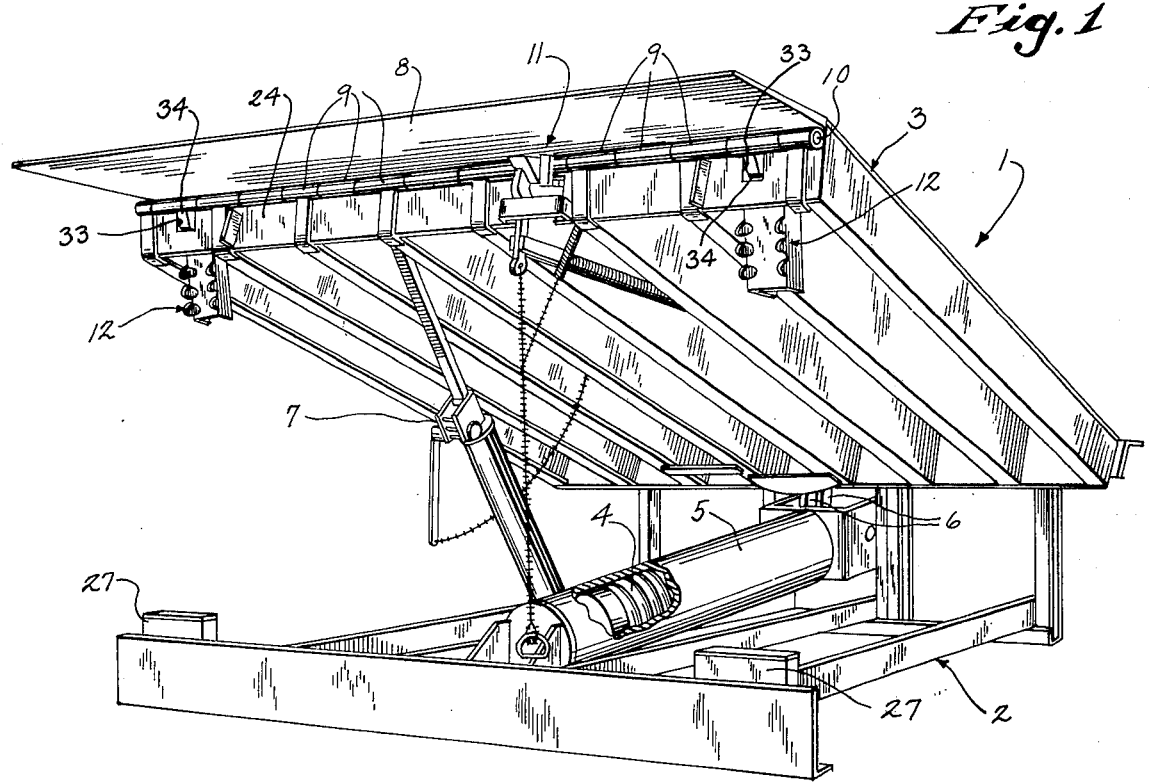
FIG. 1 is a perspective view of a dockboard incorporating the supporting leg construction of the invention with the ramp in the elevated position and the legs retracted.

FIG. 1 illustrates a dockboard 1, similar to that disclosed in the U.S. Pat. No. 3,528,118, which is adapted to be mounted in a pit or depression in a loading dock. The dockboard 1 includes a frame 2 or supporting structure and a ramp 3 is hinged at its rear edge to the frame 2. The ramp 3 is adapted to be biased upwardly to an inclined position by a spring 4 mounted within a tube 5 attached to frame 2. The rear end of the spring 4 bears against the frame 2, while the forward end of the spring is secured to a rod, not shown, that extends through the spring and is attached at its rear end to a pair of lever arms 6. The upper ends of the lever arms are secured to the rear edge of the ramp.

The force of the spring 4, if unrestrained, will act to pivot the lever arms 6 forwardly, to thereby pivot the ramp 3, to the upwardly inclined position, as shown in FIG. 1.

The ramp can be held in any desired position by means of a hold down mechanism 7, as disclosed in U.S. Pat. No. 3,137,017. The hold down mechanism 7 is an uni-directional device which prevents the upward movement of the ramp unless released, while permitting free downward movement of the ramp.

As illustrated in FIG. 1, an extension lip 8 is pivoted to the forward edge of the ramp. The lip 8 and ramp 3 carry aligned hinge tubes 9 which receive a hinge pin 10. With this construction the lip can be pivoted from the downwardly hanging pendant position to an extended position in which the ramp forms an extension to the surface of the ramp 3. Engagement of the rear edge of the lip with the forward surface of the ramp prevents the lip from moving beyond the extended position in which it is generally flush with the ramp.

The dockboard 1 also includes a lip lifting and latching mechanism 11 similar to that disclosed in U.S. Pat. Nos. 3,137,017 and 3,117,332. The lifting and latching mechanism serves to automatically move the lip from the pendant or downwardly hanging position to the extended position as the ramp is moved upwardly from the horizontal to the upwardly inclined position. The lip lifting and latching mechanism 11 also serves to latch or hold the lip in the partially extended position.

In normal operation the upper surface of the ramp 3 will be generally horizontal or flush with the upper surface of the dock. As a truck backs toward the dock the operator will release the hold down mechanism 7 through operation of a manually operated cable, thereby enabling the spring 4 to pivot the ramp to the upwardly inclined position. As the ramp moves upwardly, the lip lifting and latching mechanism 11 will move the lip 8 to the partially extended position and latch the lip in this position. With the ramp 3 in the inclined position, as shown in FIG. 1, the operator then walks outwardly on the ramp and the weight of the operator in combination with the weight of the ramp will overcome the force of the spring assembly 4, thereby enabling the ramp to lower slowly until the lip 8 engages the bed of the truck or carrier. When the lip engages the truck bed, the lip latching mechanism will release, enabling the lip to freely pivot downwardly to the pendant position when the truck moves away from the dock.

In accordance with the invention, the dockboard 1 includes a pair of legs 12, each of which is pivoted by hinge pin 13 to lugs 14 which extend downwardly from the undersurface of the ramp 3. Legs 12 are composed of a web 15 and side walls 16 which are joined to the sides of the web.

To urge the legs 12 forwardly to an upright supporting position, a pair of torsion springs 17 are wound around the projecting ends of each hinge pin 13. One end 18 of each spring 17 bears against the undersurface of the ramp while the opposite end 19 of each spring bears against a lug 20 secured to the side wall 16 of the respective leg. Each spring 17 is retained on the respective hinge pin 13 by a washer 21 and pin 22 which extends through an opening in the hinge pin. To limit the forward movement of the legs 12 with respect to the ramp 3, under the force of springs 17, stops 23 are secured to the header 24 of the ramp and engagement of the webs 15 of legs 12 with the stops 23 will restrict the forward pivotal movement of the legs 12.

Each of the legs 12 is provided with a series of punched out tabs 25, the lower surfaces of which form abutments 26 that are adapted to engage fixed supports 27 mounted on the supporting frame 2. Engagement of the lower end of each leg 12 with the respective support 27 will support the ramp in a generally horizontal cross traffic position, while engagement of each horizontally aligned pair of abutments 26 with the support 27 will serve to support the ramp in one of a series of downwardly inclined elevations. It is contemplated that the legs 12 can be provided with any number of abutments 26 which can support the ramp in a series of above dock level positions and below dock level positions.

As illustrated in the drawings, the legs 12 are coupled to lip 8 by a coupling mechanism indicated generally by 28, so that as the lip moves from the pendant to the extended position, the legs will be pivoted from the upright supporting position to a retracted position. The coupling mechanism 28 includes a pair of links 29, the upper ends of which are pivoted to the hinge pin 13. An arm 30 is welded between the upper portions of the links 29, and the outer end portion 31 of the arm 30 extends through an opening 32 in the web 15 of the respective leg, as well as through an opening 33 in the header 24.

Figure 2:
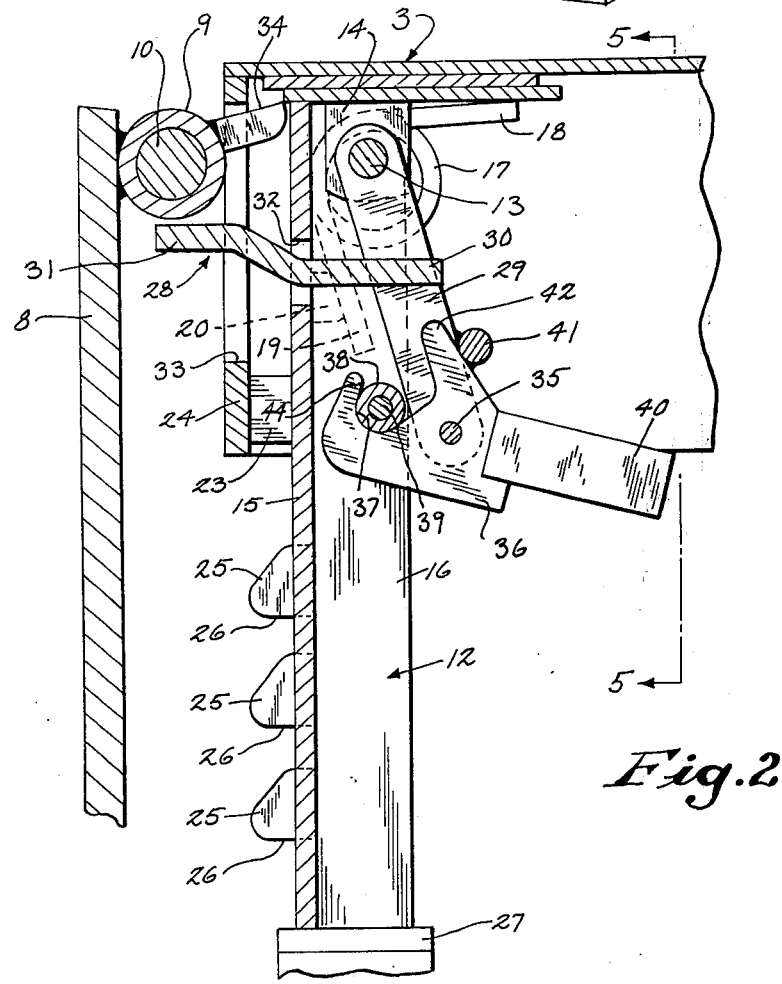
FIG. 2 is a fragmentary side elevation of the dockboard with the ramp in the cross traffic position and the lip in the pendant position.

A wiper member 34 is welded to the lip hinge tube 9 and extends through the opening 33 in the header 24. When the lip is pendant, as shown in FIG. 2, the wiper member 34 will be located beneath the ramp 3 and as the lip is pivoted toward the extended position, the wiper member 34 will engage the outer end 31 of arm 30, to thereby pivot the arm downwardly.

Pivoted to the lower ends of the links 29 by a pin 35 is a latch member 36. The forward end of the latch member 36, is provided with a hook 37 that is adapted to engage a sleeve 38 mounted on a pin 39 that extends between the side wall 16 of the leg 12. Hook 37 is engaged with the sleeve 38 under normal operating conditions so that the arm 30 and links 29 will be integrally connected to the leg 12. With the latch member 36 engaged, downward pivotal movement of the arm 30, caused by engagement of the wiper member 34, will thereby pivot the leg 12 to a retracted position, as shown in FIG. 3.

Figure 3:
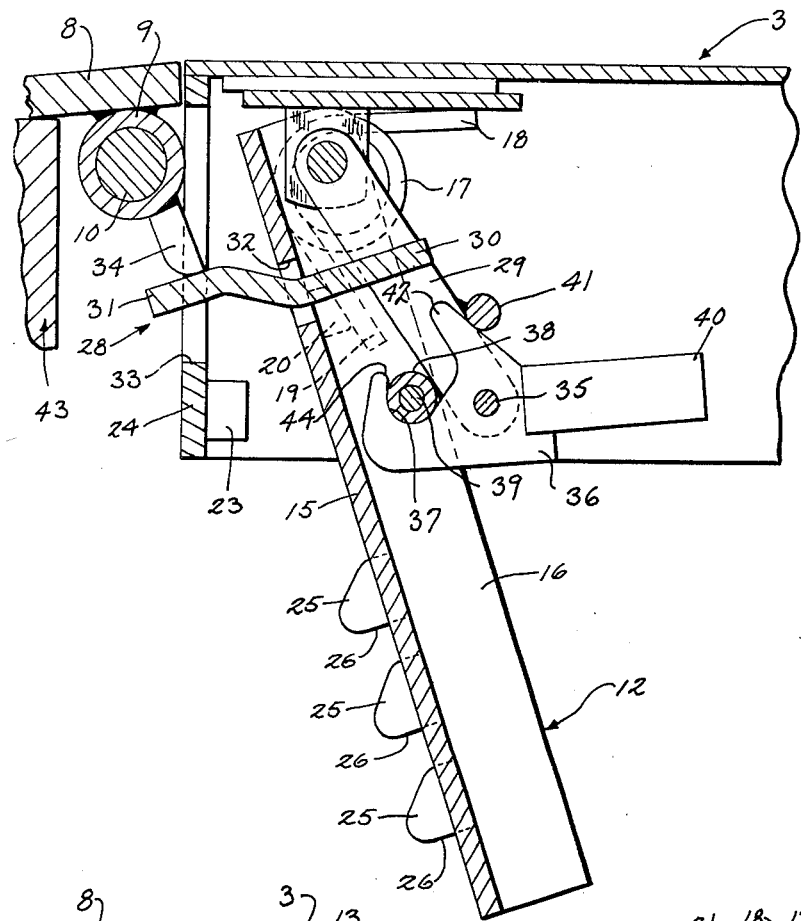
FIG. 3 is a view similar to that of FIG. 2, with the lip extended and supported on a bed of a carrier and the supporting legs retracted.
Figure 4:
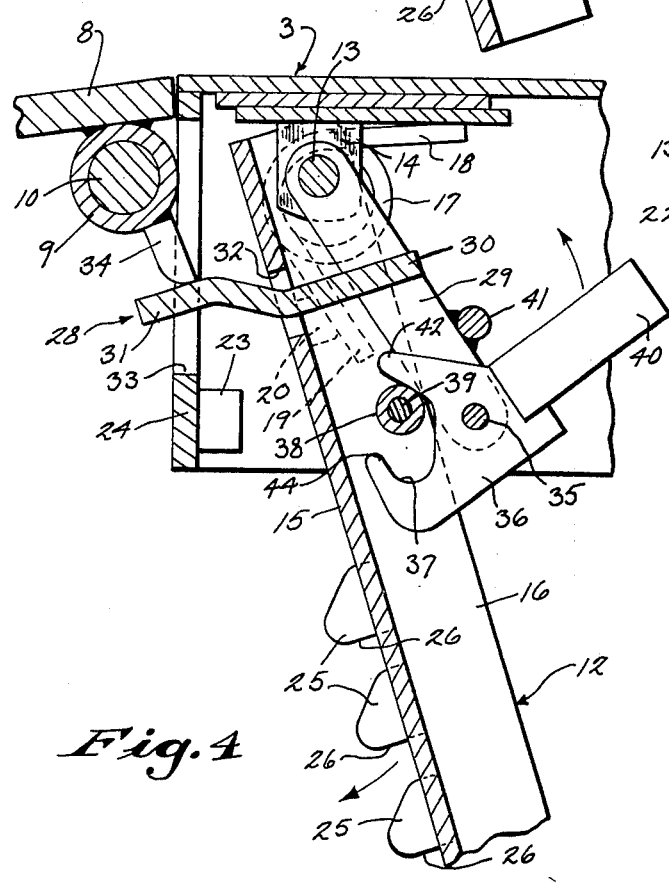
FIG. 4 is a view similar to FIG. 2 showing the latch mechanism in the released position under conditions of rapid descent of the ramp.
Figure 5:
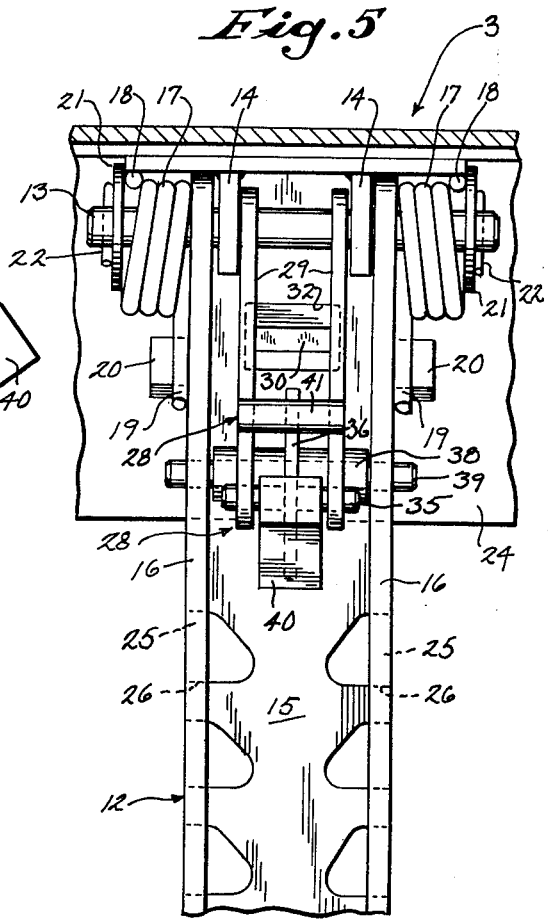
FIG. 5 is a front view of the structure as shown in FIG. 2.

A weight 40 having considerable mass extends rearwardly from latch member 36, and the weight, under normal conditions, will act to pivot the latch member 36 clockwise, as viewed in FIG. 3 and maintain engagement of hook 37 with sleeve 38.

To limit pivotal movement of the latch member 36 under the biasing effect of weight 40 when the latch member is not engaged, a stop bar 41 is secured across the rear edges of links 29 and is positioned to be engaged by a projection 42 formed on the latch member.

In operation of the dockboard, the operator, after a truck is backed into position adjacent the dock, will manually release the holddown mechanism 7 thereby enabling the counterbalancing springs assembly to pivot the ramp 3 to the upper inclined position, as shown in FIG. 1. As the ramp pivots upwardly, the lip lifting and latching mechanism 11 will act to move the lip 8 from the pendant position to the partially extended position and to lock the lip in that position. As the lip 8 moves to the extended position, the wiper member 34 will ride against the arm 30 to move the leg to the retracted position, as shown in FIG. 3. The operator then walks outwardly on the inclined ramp causing the ramp to lower slowly until the lip 8 comes to rest on the bed 43 of the truck, as shown in FIG. 3. As the lip engages the truck bed, the lip will move to the fully extended position, thereby releasing the lip latching mechanism and enabling the lip to pivot freely downwardly to the pendant position when the truck pulls away from the dock.

When the truck pulls away from the dock, the lip 8 will fall from the extended position to the pendant position, enabling the legs 12 to pivot forwardly to the upright supporting position under the force of the torsion springs 17. If the ramp is above dock level when the truck pulls away, the lower ends of the legs 12 will engage the supports 27 to support the ramp at dock level. However, if the ramp is below dock level, when the truck pulls away from the dock, one of the abutments 26 will engage the upper end of the respective supports 27 to support the dockboard in a below dock level position.

If the truck pulls away from the dock and an added load is on the ramp, such as for example, a fork lift truck or cargo, the added load will cause a rapid descent of the ramp. Due to inertia, the lip will be urged toward the fully extended position as the ramp descends rapidly. However, with the present invention, the rapid descent of the ramp will cause the weight 40 to swing upwardly relative to the ramp, thereby releasing the hook 37 from engagement with sleeve 38 and permitting the legs 12 to be biased to the upright supporting position through the action of the torsion spring 17. Thus, under conditions of a rapid gravitational descent, the acceleration responsive latching member will be released to enable the legs to return to the supporting position independent of the position of the lip. After the descent of the ramp has been stopped, the weight 40 will swing downwardly and the forward edge 44 of the latch member 26 will ride over the sleeve to effect re-engagement of hook 37 and sleeve 38.

If the ramp is at an above dock level position when the rapid descent begins, the lower ends of the legs 12 will engage the fixed supports 27 to limit further descent of the ramp, while if the ramp is at a below dock level position when the rapid descent begins, one of the pairs of abutments 26 will engage the fixed supports 27.

The supporting leg construction of the invention will serve to catch or limit descent of the ramp both under conditions of slow normal descent of the ramp and under conditions of rapid accelerated descent of the ramp.

While the above description has shown the hinged legs 12 to be associated with the ramp and the fixed supports 27 connected to the supporting frame 2, it is contemplated that the legs 12 can be associated with the supporting frame and the fixed supports can be connected to the ramp.

Various modes of carrying out the invention are contemplated as being within the scope of the following claims particularly pointing out and distinctly claiming the subject matter which is regarded as the invention.

I claim:

1. In a dockboard, a supporting structure, a ramp structure hinged at its rear edge to the supporting structure and movable from a generally horizontal position to an upwardly inclined position, a fixed support connected to one of said structures, a movable support secured to the other of said structures and movable between an operable ramp-supporting position and an inoperable position, biasing means to bias the movable support to the operable position, means for moving the movable support to the inoperable position, latch means for retaining the movable support in the inoperable position, and means responsive to a predetermined rapid downward acceleration of the ramp structure caused by descent of the ramp structure with an added load thereon for releasing said latch means whereby the movable support will be moved to the supporting position by said biasing means.

2. The dockboard of claim 1, wherein said latch means comprises a first latch member connected to the other of said structures and a second latch member on said movable support and engageable with said first latch member.

3. The dockboard of claim 2, wherein said first latch member is mounted for pivotal movement with respect to said other structure about a pivot axis and includes a latching element disposed to engage said second latch member and spaced from the pivot axis.

4. The dockboard of claim 3, wherein the means responsive to predetermined rapid downward acceleration of the ramp structure comprises a weight connected to the first latch member.

5. The dockboard of claim 4, wherein said weight is positioned with respect to the pivot axis so that on rapid downward acceleration of the ramp structure the weight will swing in a direction to release the latching element from engagement with said second latch member.

6. The dockboard of claim 1, wherein said movable support is hinged to the ramp structure and the fixed support is on the supporting structure.

7. The dockboard of claim 2, and including linkage means pivotally interconnecting the first latch member and said other structure.

8. The dockboard of claim 3, wherein said latching element comprises a hook and said second latch member comprises an abutment to be engaged by said hook.

9. The dockboard of claim 1, and including means for automatically returning the latch means to the latched position after the movable support is moved to the supporting position.

10. The dockboard of claim 1, wherein said dockboard includes a lip hinged to the forward edge of the ramp and movable between a downwardly hanging pendant position and an extended position where the lip forms an extension to the ramp, said means for moving the movable support comprising coupling means interconnecting the lip and said movable support whereby movement of the lip from the pendant to the extended position will move the movable support from the operable supporting position to the inoperable position.

11. In a dockboard, a supporting structure, a ramp structure hinged at its near edge to the supporting structure and movable from a generally horizontal position to an upwardly inclined position, a lip hinged to the front edge of the ramp and pivotable from a downwardly hanging pendant position to an extended position where the lip forms an extension to the ramp structure, a fixed support connected to one of said structures, a leg hinged to the other of said structures and pivotable between an upright ramp supporting position and a retracted inoperable position, biasing means to bias the leg to the ramp supporting position, coupling means for interconnecting the lip and the leg whereby movement of the lip from the pendant to the extended position will move the leg from the supporting position to the retracted position, latch means associated with the coupling means and movable between a latched position and a released position, said latch means when in the latched positionn serving to latch the coupling means and interconnect the lip and the leg, and means responsive to a predetermined rapid downward acceleration of the ramp structure caused by descent of the ramp structure with an added load thereon for releasing said latch means and disconnecting said coupling means whereby the leg will be pivoted to the supporting position by said biasing means.

12. The dockboard of claim 11, wherein said coupling means includes an arm, and said latch means includes a first latch element connected to said arm and a second latch element engageable with the first latch element and connected to said leg.

13. The dockboard of claim 12, wherein one of said latch elements is mounted for pivotal movement about a pivot axis, said means responsive to a predetermined rapid downward acceleration comprises a weight on the pivotally mounted latch element and spaced from the pivot axis, whereby said rapid downward acceleration will pivot said pivotally mounted latch element to release the latch means.

14. In a dockboard, a supporting structure, a ramp structure hinged at its rear edge to the supporting structure and movable from a generally horizontal position to an upwardly inclined position, a lip hinged to the front edge of the ramp and pivotable from a downwardly hanging pendant position to an extended position where the lip forms an extension to the ramp, a fixed support connected to one of said structures, a leg hinged to the other of said structures and pivotable between an upright ramp supporting position and a retracted inoperable position, biasing means to bias the leg to the ramp supporting position, releasible coupling means having an engaged position wherein movement of the lip from the pendant position to the extended position will move the leg from the supporting position to the retracted position, and said coupling means having a released position wherein the leg is movable independent of lip movement, and means responsive to a predetermined rapid downward acceleration of the ramp structure caused by descent of the ramp structure with an added load thereon for moving the coupling means to the released position whereby the leg will be pivoted to the supporting position by said biasing means.

* * * * *